June 29, 1926.

W. W. McLAREN 1,590,694

SYNCHRONIZING DEVICE

Filed Feb. 10, 1922

W. W. McLaren, Inventor

Patented June 29, 1926.

1,590,694

UNITED STATES PATENT OFFICE.

WILLIAM W. McLAREN, OF BIRMINGHAM, ALABAMA.

SYNCHRONIZING DEVICE.

Application filed February 10, 1922. Serial No. 535,640.

This invention aims to provide a novel means for producing synchronism between a talking machine and a motion picture machine.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
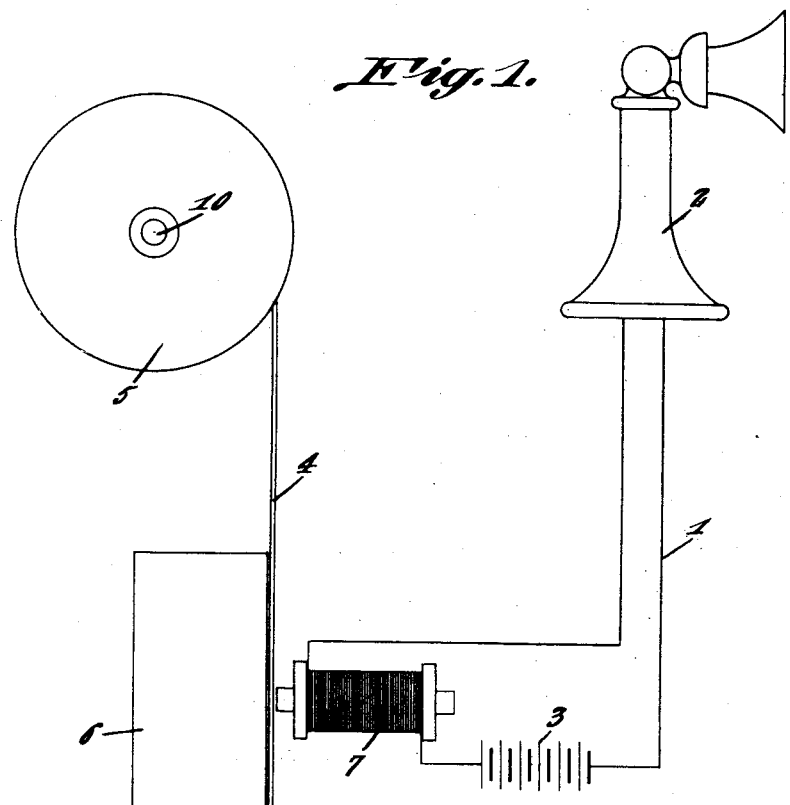
Figure 2:
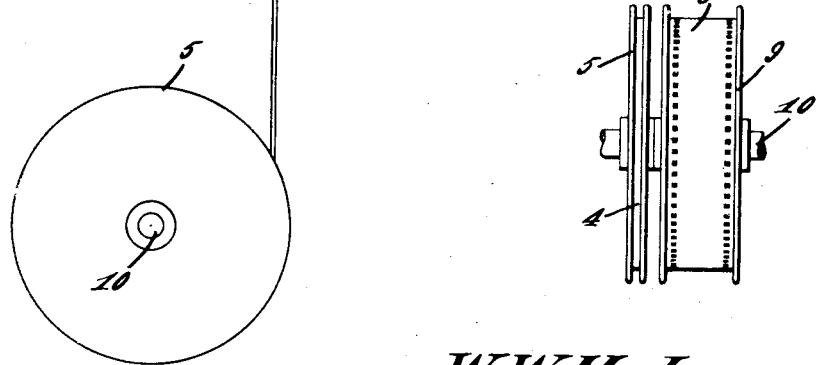

Figure 1 shows in elevation, and diagrammatically one means whereby the tape which operates the sound reproducing mechanism may be magnetized; Figure 2 is an elevation showing the drums or reels on which the motion picture film and the tape which is magnetized may be carried.

Referring to Figure 1, the numeral 1 denotes a circuit wherein is located a transmitter 2, a source of electrical energy 3 and a magnet 7. A metal tape 4 made of any desired material, is mounted to move close to and within the field of the magnet 7, the tape, if desired, being carried by drums or reels 5, the tape moving along a support or backing 6. The film is shown at 8. Any desired means may be provided for advancing the tape 4 with the film 8. Thus, as indicated in Figure 2, the film 8 may be carried by reels 9, one of the drums 5 and one of the reels 9 being secured to a shaft 10.

When the film 8 is advanced, during the making of a motion picture, the tape 4 is advanced simultaneously with the movement of the film. The proper dialogue to accompany the picture is spoken into the transmitter 2, the plate 4 being magnetized, from the magnet 7, to correspond with the action taking place in the magnet responsive to the words spoken in the transmitter 2.

The device claimed may be used in connection with a receiver, as well as in connection with a transmitter, the substitution of a receiver for the transmitter 2 being an obvious change lying well within the skill of a person versed in the art.

Having thus described the invention, what is claimed is:

In a device for producing synchronism between projection and dialogue, spaced shafts each of which is rotatable, first and second drums fixed to each shaft for simultaneous rotation therewith, a film engaged at its ends with the first drums, and a metallic ribbon engaged at its ends with the second drums, the ribbon being differently magnetized throughout its length, the first and second drums being spaced apart transversely on each shaft, and each drum being provided on both edges with flanges which engage both edges of the film and of the ribbon respectively, the construction being such as to prevent the edges of the ribbon and of the film, positively, from overlapping, thereby to render the ribbon and the film, each, freely removable, during projection, independently of the other, and to render the adjacent inner edges of the film and the ribbon accessible.

In testimony that I claim the foregoing as my own, I have hereto affixed my signature.

WILLIAM W. McLAREN.